Dec. 24, 1935.  V. DURBIN  2,025,233
DISTRIBUTION PANEL
Filed Sept. 15, 1933  5 Sheets-Sheet 4
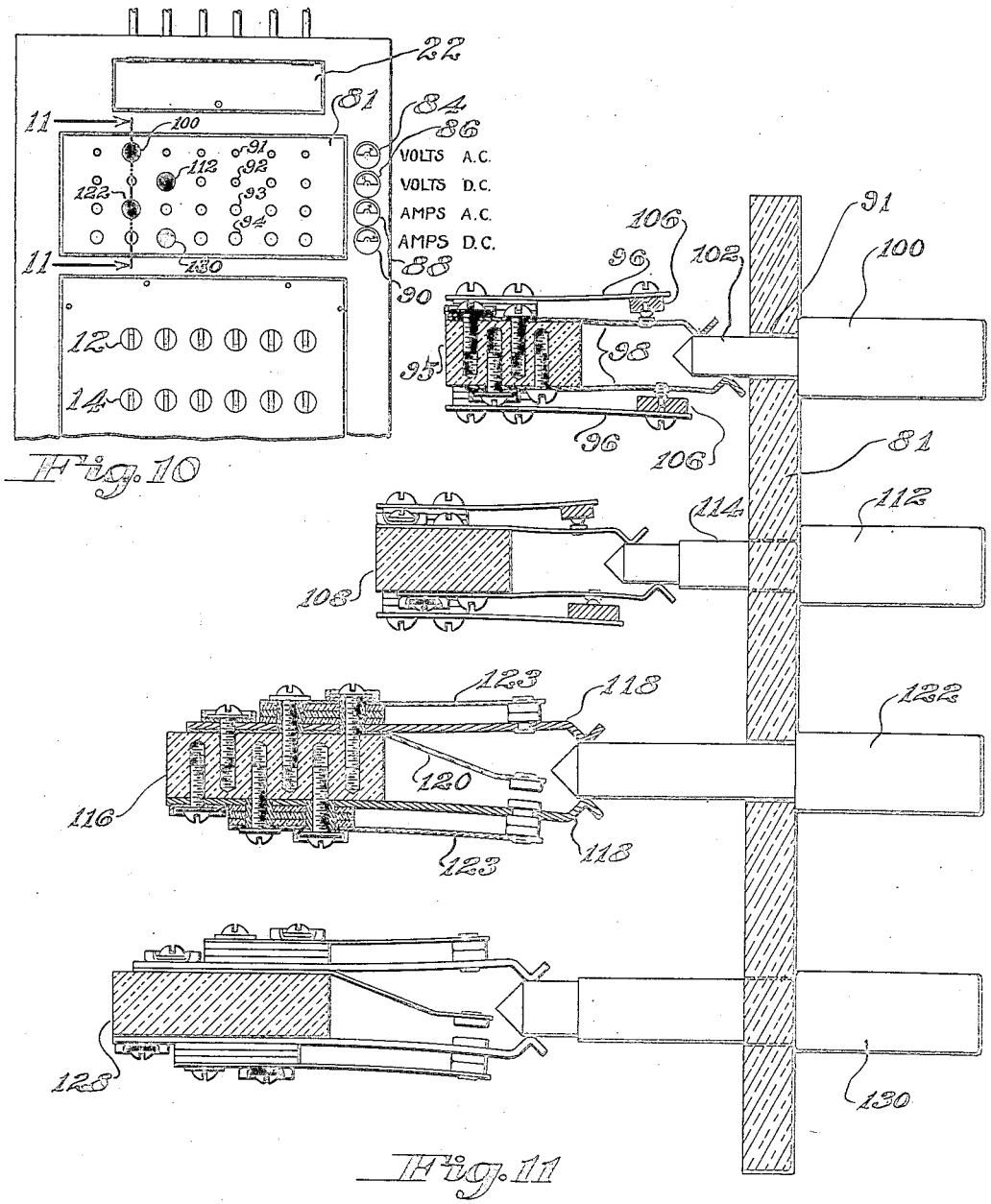

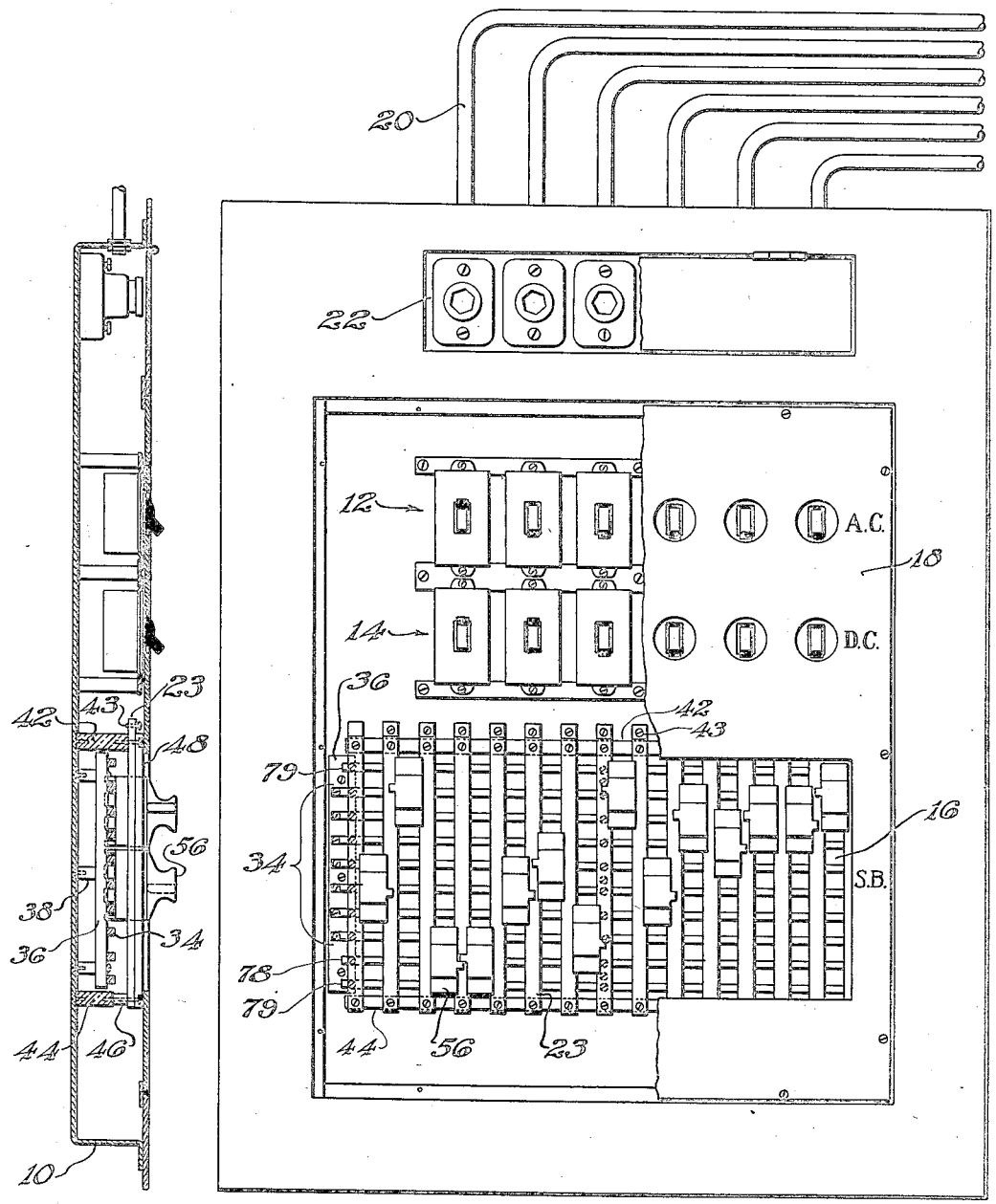

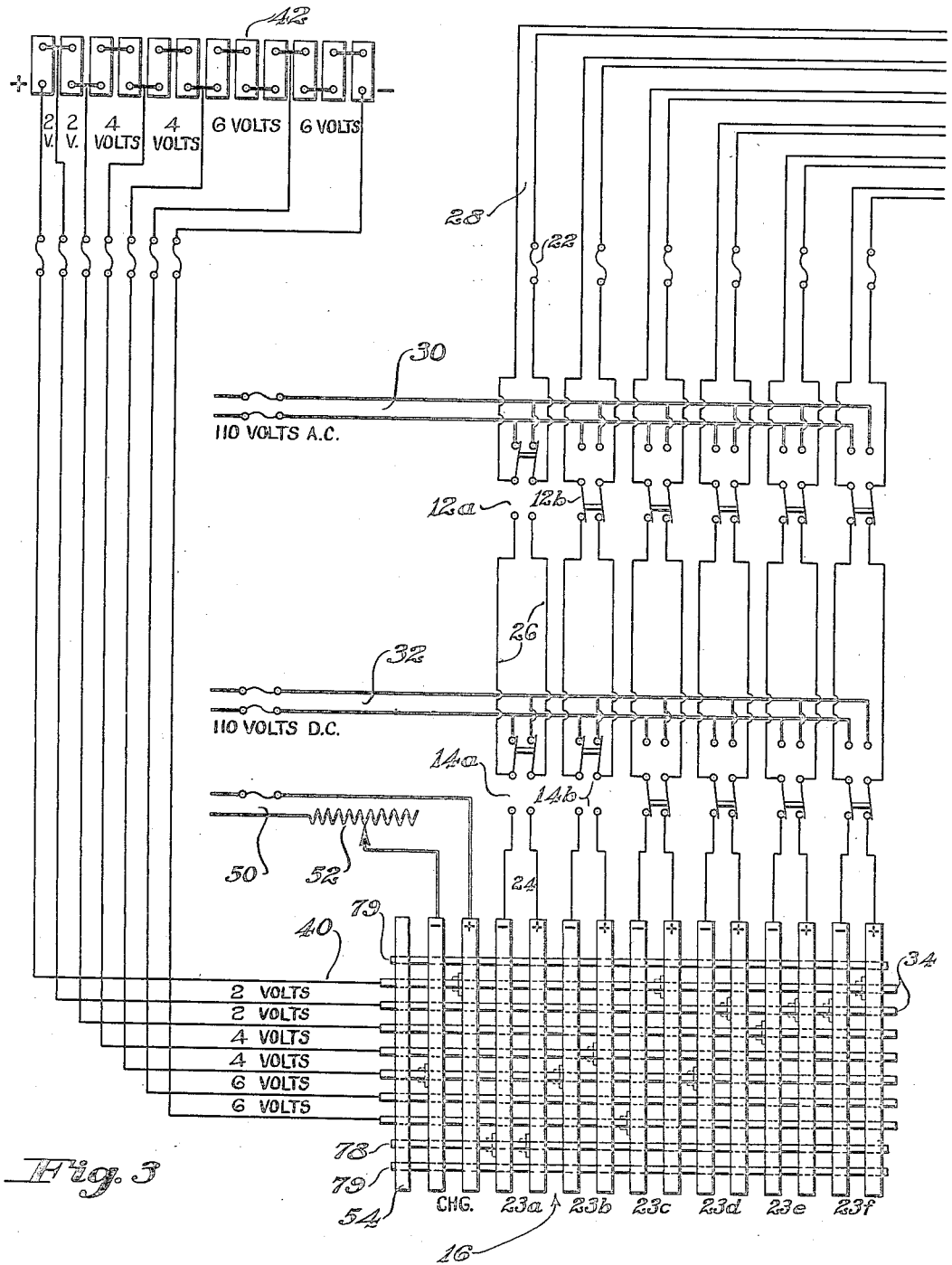

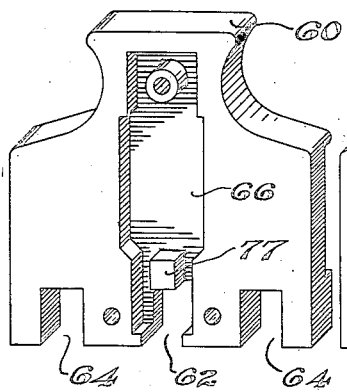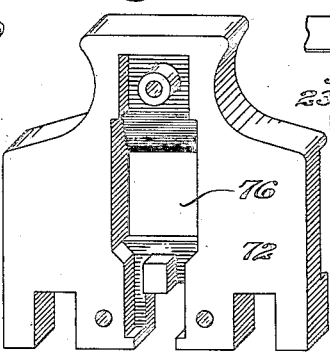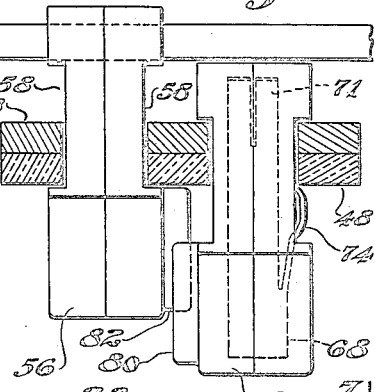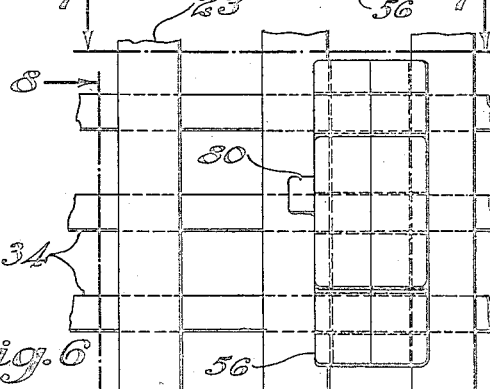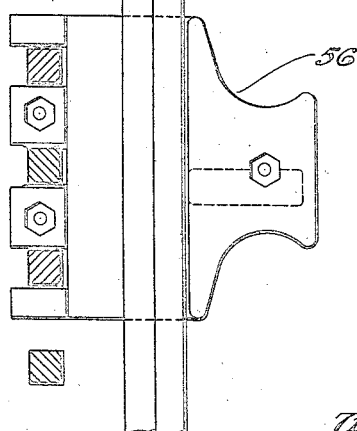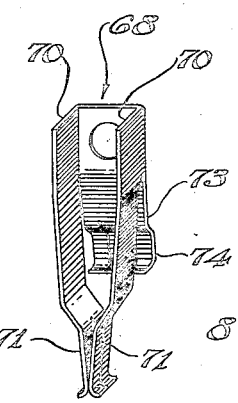

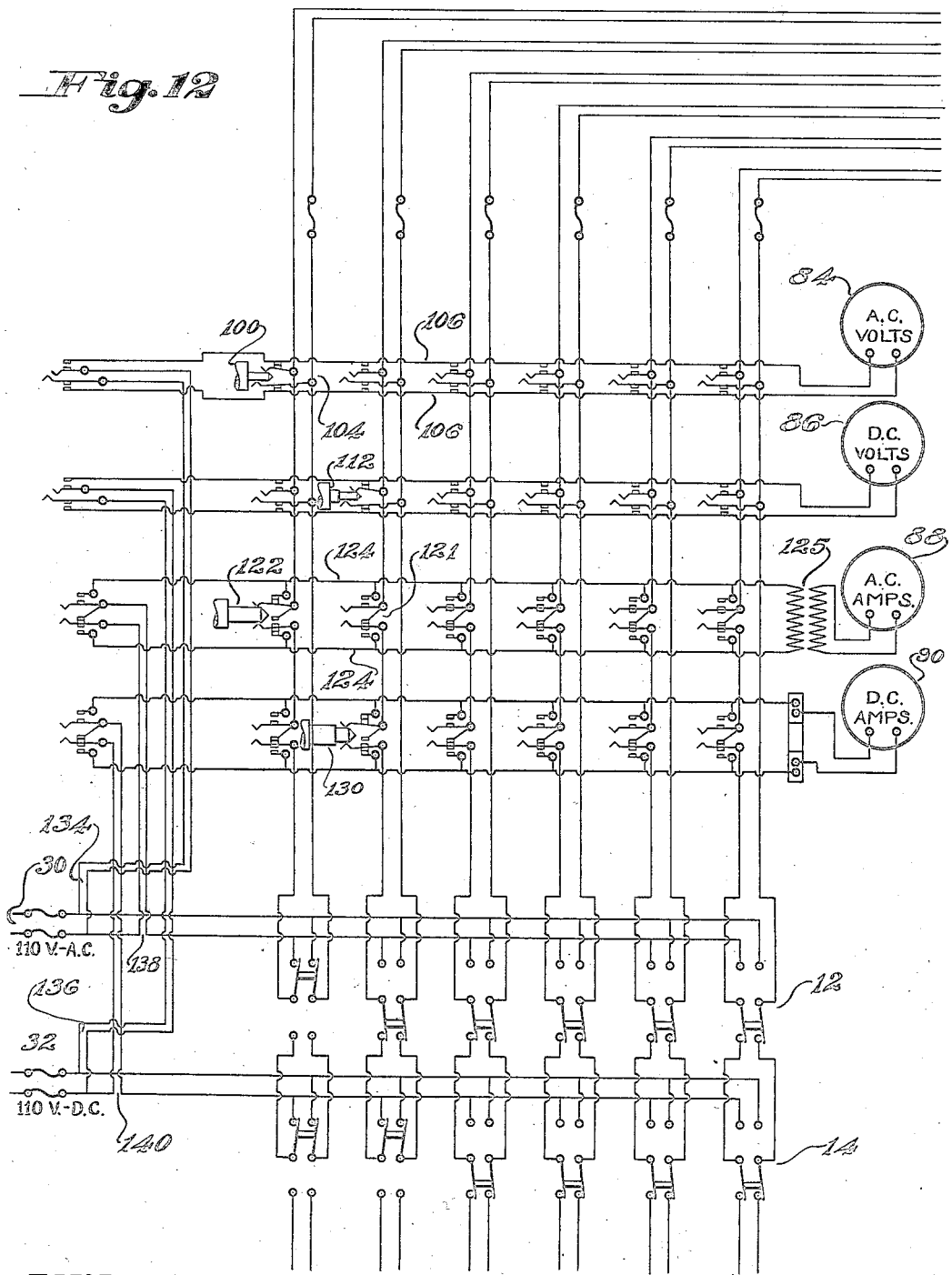

Patented Dec. 24, 1935

2,025,233

UNITED STATES PATENT OFFICE 2,025,233

DISTRIBUTION PANEL

Vernon Durbin, Newton, Mass., assignor to The Holtzer-Cabot Electric Company, Roxbury, Mass., a corporation of Massachusetts Application September 15, 1933, Serial No. 689,588

15 Claims. (Cl. 171—97)

The present invention relates to distribution panels.

In electrical laboratory work, it is frequently necessary to distribute to a number of students' tables a plurality of selected electrical voltages of different character, for example, alternating current, direct current, and a variable low voltage from a storage battery source. The selection of the desired source of voltage for each student has heretofore generally been accomplished by cord and plug connections which, besides being unsightly, are likely to lead to improper connections, such as short-circuits or cross-overs, on account of the confusing arrangements of the leads.

The object of the present invention is to provide a distribution panel, whereby electrical energy of a selected character may be supplied to individual students, while at all times giving a definite indication of the type of energy supplied and preventing any erroneous connections between the different sources.

With this object in view, the present invention comprises the apparatus hereinafter described and particularly defined in the claims.

In the accompanying drawings, Fig. 1 is a front elevation of the preferred form of apparatus according to the present invention, a portion of the covered panel being broken away; Fig. 2 is a sectional elevation of the panel; Fig. 3 is a wiring diagram; Figs. 4 and 5 are perspective detail views of a slider; Fig. 6 is an enlarged front elevation of a portion of the slider; Fig. 7 is a section on line 7—7 of Fig. 6; Fig. 8 is a section on line 8—8 of Fig. 6; Fig. 9 is a perspective detail view of a spring contact member; Fig. 10 illustrates a modified form of the apparatus; Fig. 11 is an enlarged elevation of the jacks used in the panel illustrated in Fig. 10; and Fig. 12 is a wiring diagram of the arrangement illustrated in Figs. 10 and 11.

The particular embodiment of the invention illustrated in the drawings comprises a laboratory panel for selectively controlling the supply to six students of 110 volts A. C., 110 volts D. C., or any storage battery voltage from two to twenty-four volts.

The apparatus comprises a casing 10 enclosing a row of six double-pole double-throw switches 12 for controlling the supply of alternating current to the individual students, a second row of double-pole double-throw switches 14 for controlling the supply of direct current, and a storage battery voltage selector indicated generally at 16. The switches and the selector are partially enclosed by a front panel 18. From the top of the casing, six conduits 20 lead to the individual benches. Fuses 22 are provided for the individual outlet lines. Referring to the wiring diagram of Fig. 3, the storage battery voltage selector 16 includes six pairs of vertical voltage selector bars 23, grouped in six pairs, designated 23ª, 23ᵇ, etc., the bars of each pair being marked "minus" and "plus". There is one A. C. switch 12, one D. C. switch 14, and one pair of selector bars for each of the conduits 20. Means are provided for energizing any pair of selector bars with any desired storage battery voltage. This means will later be described in detail, but for the present, each pair of bars may be considered as a source of selected D. C. voltage. Taking the pair 23ª, for example, they are connected by wires 24 with the lower set of fixed contacts of the first D. C. switch, designated 14ª. The blade contacts of the switch are connected by wires 26 with the lower contacts of the A. C. switch 12ª. The blade contacts of this switch are connected to wires 28 which lead into the first conduit 20, the fuse 22 being connected in one of the wires 28. Similar connections are provided for the other rows of selector bars and switches. A voltage supply of 110 volts A. C. is connected to the upper contacts of all the switches 12, as indicated by the heavy leads 30 and a voltage supply of 110 volts D. C. is connected to the upper contacts of all the switches 14, as indicated by the leads 32.

It will be observed that with the A. C. switch closed on its upper contacts, as indicated for the switch 12ª, the output leads 28 are energized with alternating current, regardless of the setting of the D. C. switch 14ª or of the voltage on the storage battery selector bars. Thus, closure of the A. C. switch cuts off all other sources of voltage. The second switch 12ᵇ is shown as closed on the lower contacts, thereby cutting off the supply of alternating current from the students' lines and throwing the control on the D. C. switch 14ᵇ. This latter switch is shown as closed on the upper contacts, thereby energizing the students' line from direct current leads 32 and cutting out the storage battery voltage on the selector bars 23ᵇ.

The remaining four switches of each row are shown closed on the lowermost contacts, thereby supplying a connection from the respective selector bars 23ᶜ, 23ᵈ, etc. to the students' line. With both closed on their lowermost contacts, the 110 volt A. C. and D. C. supplies are isolated from the students' line.

Referring now to the construction of the selector 16, this comprises a series of seven horizontal buses 34 which are mounted at their ends on vertical insulating strips 36 mounted on spacers 38 attached to the rear wall of the casing. The buses are connected by individual wires 40 with separate cells of a 24 volt storage battery 42. The voltage connections are such that any desired voltage between two volts and twenty-four volts may be taken off between two selected buses 34. The vertical supply bars 23 which form the selector bars of the several pairs are supported at their upper ends on a horizontal insulating strip 42 which extends across the rear wall of the casing, each bar extending slightly above the strip 42 to accommodate a wiring connection 43. At their bottom ends, the bars 23 are mounted on a strip 44 which, as shown in Fig. 2, is somewhat narrower than the strip 42, the bars being held in proper position by means of individual spacers 46. Each strip 23 is covered with a facing strip 48 of insulating material.

In addition to the vertical bars 23 of the pairs above described, there is another pair marked CHG, to which is connected a charging line 50 through a rheostat 52, for the purpose of applying any selected charging voltage to the batteries. An additional vertical bar 54 is provided at the left side to position a voltage selecting slider 56 presently to be described.

The sliders 56 are used for the purpose of electrically connecting any desired horizontal bus with any vertical bar. One pair of sliders is provided for each pair of vertical bars. Each slider comprises a two-part element of insulating material, as shown in Figs. 4 and 5. The slider is provided at each side with a vertical slot 58 to slide over two adjacent bars 23, the slot being somewhat wider than the bars. The front face of the slider is provided with a convenient grip 60 and the rear face has a central slot 62 to receive one of the horizontal buses 34. The rear face also has two positioning slots 64 to receive the buses immediately above and below the one received in the central slot 62. Each element is recessed, as indicated at 66, to receive a spring contact member 68, indicated in Fig. 9. This contact member has two opposed leaves 70 having spring contact portions 71 received in the slot 62 and spread apart by spacers 72 integrally molded in the slider elements. The contact member has a third leaf 73 which is perpendicular to the leaves 70 and which is formed with a bent spring contact 74 which protrudes through an opening 76 in the side of the right-hand element of the slider. The contact springs 71 embrace a selected horizontal bus and the contact 74 engages the vertical bar 23 at the right-hand side of the slider.

In addition to the horizontal buses 34, there is provided at the bottom a dead bus 78, with which the slider contact may engage for zero voltage, and two positioning bars 79 at top and bottom for engaging in the slots 64 when the slider is in top or bottom position.

The sliders are arranged in pairs, the right-hand or positive slider being preferably colored red and the left-hand or negative slider being colored black. The positive slider is provided on its left-hand side with a projection 80 and the negative slider is provided with a similar projection 82 on the right-hand side, the purpose of these projections being to prevent movement of one slider past the other. As a result, the positive slider is always maintained above the negative slider, thereby providing assurance against reversal of polarity of the leads. As shown in Fig. 6, the projections are displaced slightly from the centers of the sliders so that the two selectors can, if desired, be set to engage the same horizontal bus.

Any slider may be adjusted by simply drawing it outwardly to disengage it from the horizontal buses, as shown for the right-hand slider of Fig. 7, then sliding it to its new position and pushing it inwardly for engagement with the selected bus. The slider and the insulating face strip 48 may be marked with any suitable indicia to indicate the potential for any position of the slider.

If the front closure panel 18 is removed, any slider may be easily taken out by sliding it below the lower ends of the vertical bars 23.

In the wiring diagram of Fig. 3, various connections of the contact members 68 with respect to the horizontal and vertical bars are indicated.

The voltage for charging may be electrically connected from any suitable source, such as a rectifier, to all or any group of cells of the battery. This is an important feature, since all the members of a class may work on the same experiment, with a consequent drain on a portion only of the battery, with the result that the used portion should be charged without passing charging current through the remainder of the battery. This is easily accomplished by setting the sliders on the charging section, and by adjusting the charging rate by the rheostat 52.

It will be seen that the voltage controls associated with any pair of output leads are in effect connected in series and so arranged that the closure of either switch on its appropriate voltage supply isolates all sources farther removed from the output leads. A positive indication of the character of the voltage supply to any student is directly indicated by the positions of the switches and sliders on the panel and the supply to any student may be quickly changed merely by throwing one or both of the switches and by setting the sliders to any desired position.

As an additional feature, the invention contemplates the use of a meter control panel as shown in Figs. 10, 11 and 12, whereby the current and voltage on either of the main lines or any of the students' lines may be indicated. To this end, the meter control panel 81 is interposed between the row of switches 12 and the fuse box 22, as shown in Fig. 10. This panel has a number of openings arranged in four horizontal rows and seven vertical columns. The extreme left-hand column is used for controlling the indication of voltages and currents on the A. C. and D. C. lines and the remaining six columns are disposed immediately above the six sets of control switches for the individual students' lines. Adjacent to the rows of holes are an A. C. voltmeter, and a D. C. voltmeter, and A. C. ammeter and a D. C. ammeter indicated at 84, 86, 88 and 90 respectively.

The holes of the four rows are of varying sizes, as indicated in exaggerated fashion at 91, 92, 93 and 94 in Fig. 10. A single set of four plugs is provided, each adapted to enter only the holes of its corresponding row.

Immediately in back of each of the holes 91 of the uppermost row is a jack-switch 95 having a pair of fixed leaves 96 and a pair of movable leaves 98, the latter being adapted to be spread into contact with the leaves 96 by means of a plug 100 having a short end portion 102 of such a size as to fit snugly within the opening. The movable leaves 98 are connected to opposite sides of the corresponding line, as indicated at 104 in Fig. 12. Attached to all of the fixed leaves 96 of the row are a pair of common buses 106 which are electrically connected with the A. C. voltmeter 84, as shown in Fig. 12.

Immediately below each switch 95 is a D. C. voltmeter switch 108, identical in construction with the switch 95 except that it is spaced farther from the panel 81. The hole 92 is larger than the hole 91, and the plug 112 therefor has a portion 114 of enlarged diameter which cannot enter any of the holes 92. Thus the plug 100 cannot be used to control the D. C. voltmeter switch nor can the plug 112 be used to control the A. C. voltmeter switch. The contacts of the switch 108 are connected to the lines and to the D. C. voltmeter in the same fashion as the connections for the A. C. voltmeter above described.

Behind each of the holes 93 of the third row of the panel is an A. C. ammeter control switch 116 having a pair of movable contacts 118 normally shunted by means of a bridge contact 120. The leads 118 are connected in the corresponding line, as indicated at 121 in Fig. 12, and are adapted to be spread by a plug 122 into contact with stationary leaves 123. The leaves 123 of all the switches of the row are connected by wires 124 with a transformer 125 connected to the A. C. meter 88. The openings 93 of the panel are of increased diameter and the switch 116 is disposed at a greater distance from the rear of the panel than either of the switches 95 or 108. The plug 122 cannnot be introduced into the holes of the upper rows.

Immediately behind the bottom row of holes 94, which are of the largest size, is a row of switches 128 which are identical with the switches 116 except that they are disposed still farther from the panel. The switches are operated by a plug 130 which is of maximum diameter and length. These switches are connected to the D. C. ammeter 90, the connections being identical with those for the A. C. ammeter, described above.

The four switches of the column at the left-hand end of the meter control panel are connected with the other switches of the corresponding rows, as shown in Fig. 12. For the A. C. voltmeter connection, wires 134 lead from opposite sides of the line 30 to the movable contacts of the uppermost switch of the row. For the D. C. voltmeter connection, wires 136 lead from opposite sides of the direct current line 32 to the movable contacts of the second switch.

Wires 138 are cut into one side of the A. C. line 30 and lead to the movable contacts of the A. C. ammeter control switch, and wires 140 cut into the D. C. line 32 lead to the movable contacts of the D. C. ammeter control switch at the bottom of the column.

The switches may be supported on the panel by any suitable brackets, not shown.

It will be observed that each plug may be used to actuate a switch of its corresponding row only. Accordingly, since only one set of plugs is provided, it is impossible to close more than one switch in any row at any time. Accordingly, all possibility of short circuits or crossovers between circuits at different potentials is avoided. The arrangement affords a convenient means of determining the voltage or current on either of the main lines or on any of the individual students' lines at the option of the instructor.

Although the invention has been illustrated and described as embodied in a distribution apparatus of particular form for a particular use, it will be understood that the invention may be modified both as to construction and purpose within the scope of the appended claims.

Having thus described the invention, what is claimed is:

1. Distribution control apparatus comprising a plurality of voltage sources of different character, output leads, series control devices for selectively connecting a selected source with the leads, and means operated by any control device, when connecting its source to the leads, for isolating from the leads all sources farther removed therefrom.

2. Distribution control apparatus comprising a pair of output leads, a plurality of double-throw switches having connected contacts, one of said switches being connected with the output leads, a source of voltage connected with each switch, and an additional source of voltage connected with contacts of the switch farthest removed from the output leads.

3. Distribution control apparatus comprising a pair of output leads, a plurality of double-pole double-throw switches, one of the switches having one pair of fixed contacts connected to the output leads, series connections between fixed contacts of all the switches, voltage sources connected to the blade contacts of the several switches, and an additional source connected to fixed contacts of the switch farthest removed from the leads.

4. A voltage selector comprising a plurality of buses adapted to be energized at different potentials, a transverse bar, and a slider on the bar having a contact to engage the bar and any selected bus.

5. A voltage selector comprising a plurality of buses adapted to be energized at different potentials, a pair of bars transverse to the buses, output leads for the bars, a slider for each bar, and a contact engaging with the bar and adapted to engage a selected bus.

6. A voltage selector comprising a plurality of buses adapted to be energized at different potentials, a pair of bars transverse to the buses, output leads for the bars, a slider for each bar, and a contact engaging with the bar and adapted to engage a selected bus, the sliders having cooperating means to prevent moving one slider past the other.

7. A voltage selector comprising a plurality of buses adapted to be energized at different potentials, a pair of bars transverse to the buses, output leads for the bars, a slider movable between the bars having a slot to receive one of the buses and an opening in one side, and a spring contact member in the slider having a leaf extending through the opening to engage one of the bars and a leaf in the recess to engage a selected bus.

8. A voltage selector comprising a plurality of buses adapted to be energized at different potentials, a pair of bars transverse to the buses, output leads for the bars, a slider movable between the bars and having side slots to receive the bars and a rear recess to receive one of the buses, the slider having an opening in one side, and a spring contact member having a pair of opposed leaves in the rear recess to embrace the bus and a side leaf extending through the side opening to contact with one of the bars.

9. A voltage selector comprising a plurality of buses adapted to be energized at different potentials, a plurality of individual pairs of feeder bars arranged transversely of the buses, and sliders on the feeder bars for selectively connecting any feeder bar with any bus.

10. A voltage selector comprising a plurality of buses adapted to be energized at different storage battery potentials, a plurality of feeder bars transverse to the buses, a charging feeder bar to be energized for charging the battery, and sliders for connecting each bar with a selected bus.

11. A voltage selector comprising a plurality of buses adapted to be energized at different storage battery potentials, a plurality of individual pairs of output feeder bars, a pair of charging feeder bars, the feeder bars being transverse to the buses, and a slider for each bar to connect the bar with a selected bus.

12. Distribution control apparatus comprising a plurality of series connected double-throw switches, each having a source of voltage connected therewith, output lines connected to one of said switches, a storage battery selector having buses to be energized at different battery potentials and a pair of transverse feeder bars connected to the switch farthest removed from the output lines, and means for connecting the feeders to selected buses.

13. Distribution control apparatus comprising a plurality of series connected double-throw switches, each having a source of voltage connected therewith, output lines connected to one of said switches, a storage battery selector having buses to be energized at different battery potentials and a pair of transverse feeder bars connected to the switch farthest removed from the output lines, a pair of charging feeder bars, and means for connecting the feeders to selected buses.

14. Distribution control apparatus comprising a plurality of output lines, a plurality of rows of double-pole double-throw switches, the switches of one row having fixed contacts connected to corresponding output lines and other fixed contacts connected with the fixed contacts of the corresponding switches of the next row, sources of voltage of different character connected to the blade contacts of the switches of the separate rows, a battery selector having a plurality of buses to be energized at different potentials, a plurality of transverse feeders arranged in pairs, each pair being connected to the fixed contacts of the corresponding switch farthest removed from the output line, and means for electrically connecting any feeder to a selected bus.

15. Distribution control apparatus comprising a plurality of output lines, a plurality of rows of double-pole double-throw switches, the switches of one row having fixed contacts connected to corresponding output lines and other fixed contacts connected with the fixed contacts of the corresponding switches of the next row, sources of voltage of different character connected to the blade contacts of the switches of the separate rows, a battery selector having a plurality of buses to be energized at different potentials, a plurality of transverse feeders arranged in pairs, each pair being connected to the fixed contacts of the corresponding switch farthest removed from the output line, a pair of charging feeders, and means for electrically connecting any feeder to a selected bus.

VERNON DURBIN.